Figures 1, 2:
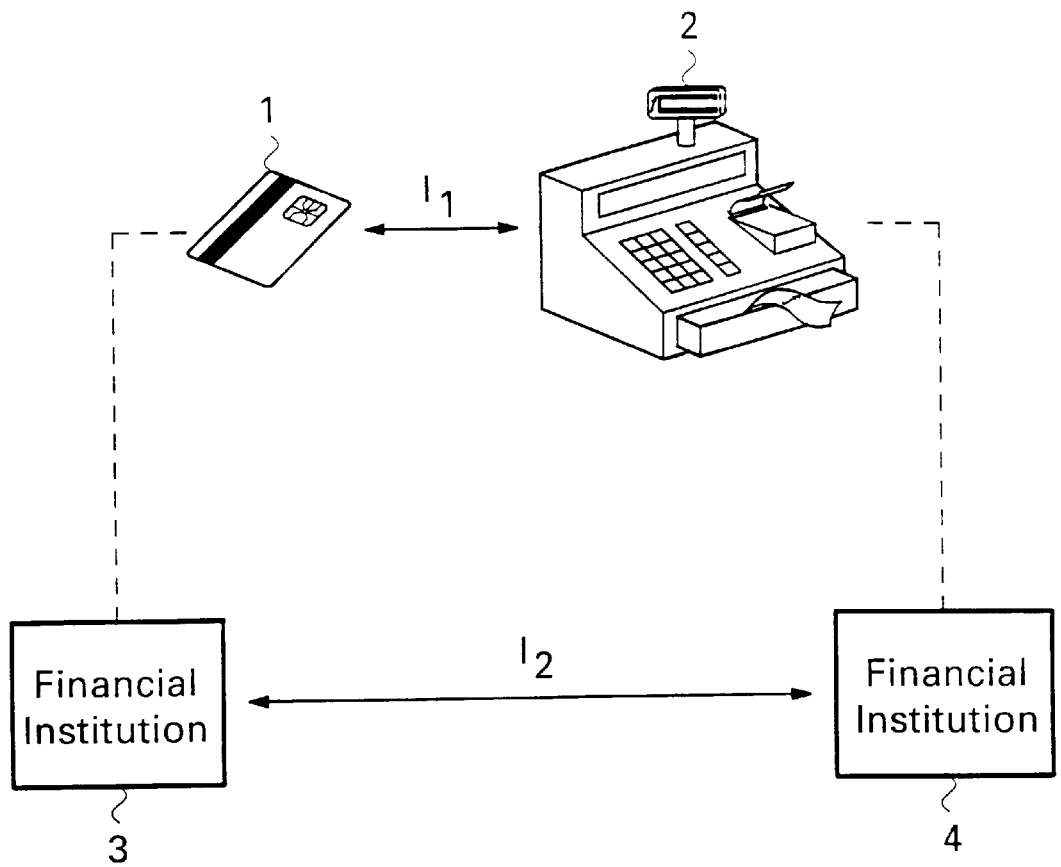

United States Patent
De Rooij et al.

[11] Patent Number: 6,016,955
[45] Date of Patent: Jan. 25, 2000

[54] ELECTRONIC PAYMENT METHOD AND SYSTEM HAVING SEVERAL CALCULATION UNITS AND ELECTRONIC PAYMENT DEVICES

[75] Inventors: Peter Jacobus Nicolaas De Rooij, Leuven, Belgium; Frank Muller, Delft, Netherlands; Rafael Hirschfeld, Amsterdam, Netherlands; Jean-Paul Boly, Zoeterwoude, Netherlands

[73] Assignee: Koninklijke KPN N.V., A E Groningen, Netherlands

[21] Appl. No.: 08/911,362

[22] Filed: Aug. 7, 1997

Related U.S. Application Data

[63] Continuation of application No. 08/645,494, May 13, 1996, abandoned.

[30] Foreign Application Priority Data

May 12, 1995 [NL] Netherlands ............................ 1000352

[51] Int. Cl.[7] .............................. G06F 17/60; G06K 19/06
[52] U.S. Cl. .............................. 235/379; 235/492; 902/11
[58] Field of Search .................................. 235/379, 492, 235/487; 902/11; 380/24

[56] References Cited

U.S. PATENT DOCUMENTS

| | | | |
|---|---|---|---|
| 4,295,039 | 10/1981 | Stuckert | 235/380 |
| 4,766,293 | 8/1988 | Boston | 235/379 |
| 4,935,962 | 6/1990 | Austin | 380/25 |
| 4,992,646 | 2/1991 | Collin | 235/375 |
| 5,440,634 | 8/1995 | Jones et al. | 380/24 |

FOREIGN PATENT DOCUMENTS 0 028 965   5/1981   European Pat. Off. .

*Primary Examiner*—Thien M. Le
*Assistant Examiner*—Daniel H. Sherr
*Attorney, Agent, or Firm*—Oblon, Spivak, McClelland, Maier & Neustadt, P.C.

[57] ABSTRACT

A payment system for use with electronic payment devices. Electronic payment cards (e.g. "Smart Cards"), may be used with one or more payment stations (e.g. electronic cash registers). The payment stations are designed for receiving, during a payment transaction, a monetary value by crediting, in the payment station, a first value, and debiting, in the payment means, a second value corresponding to the first value. The first and second values may be expressed in different calculation units, such as currencies of different countries. The system furthermore offers a payment device for application in such a system, and a method for effecting a payment transaction with an electronic payment means.

15 Claims, 3 Drawing Sheets

ELECTRONIC PAYMENT METHOD AND SYSTEM HAVING SEVERAL CALCULATION UNITS AND ELECTRONIC PAYMENT DEVICES

CROSS REFERENCE TO RELATED APPLICATION

This is a continuation application of Ser. No. 08/645,494, filed May 13, 1996 now abandoned.

BACKGROUND OF THE INVENTION

1. Field of the Invention

The invention relates to a payment system having electronic payment means, such as so-called "chip cards" or "smart cards". More specifically, the invention relates to a payment system including electronic payment means and one or more payment stations. Which payment stations are designed to receive, during a payment transaction, a monetary value by crediting, in the payment station, a first balance with a first value. Moreover of the payment means, is debited a second balance by a second value corresponding to the first value. Both balances represent numbers of calculation units.

2. Discussion of the Background

Electronic payment systems having (electronic) payment means, are known in practice. Prior art payment means (payment cards) comprise one or more integrated circuits ("chips"), which are mounted on a plastic substrate. In such an arrangement, at least one integrated circuit includes a processing unit (microprocessor) for carryingout operations, (e.g., computations and (cryptographic operations, and a storage unit (memory) for storing data, (e.g., monetary values and cryptographic data). Monetary values may be recorded as counter readings, with a certain counter reading corresponding to a certain amount of money in the currency in question. In the event of application of such payment means in a payment transaction, the monetary value is debited by lowering counter readings (possibly the contents of specific memory positions).

Since the possible applications of such payment means may be considerably extended if they are capable of being used in more than one country, it has been proposed to accommodate several currencies in one payment means. For this purpose, the storage means are provided with several counters, each of which updates a value of a certain currency. At the same time, the payment means is designed to each time draw on that currency, which is used in the country in question. Thus, this prior art payment means will have a counter which records a value in guilders (stock or "pot" of Dutch guilders) and another counter which records, e.g., a value in German marks. In this manner, it is possible to pay in the Netherlands with guilders and in Germany with marks.

Although a payment system having such prior art payment means is fit for use, it has several drawbacks. Thus, the number of different currencies is limited by the number of counters on the card which, due to the available memory space (or capacity of the hardware) is bound by a maximum. If such a payment means has been in use for some time in a relatively large number of countries, many counters will be in use and in practice be occupied by a small amount of foreign currency. This situation is similar to the one of ready cash, with a traveller, after his trip, in most cases being left with several coins of various currencies. As a result, it is not possible to add a new currency to the payment means without erasing a counter. In addition, such residual values together may constitute an expense for the user.

Prior art devices dealing with multiple currencies do not solve these problems. European patent application EP 0 251 619, for example, discloses a transaction card capable of performing payments in alternate currencies. A transaction limit may be converted into another currency, but the actual payments are made in a single currency, thus leaving the card holder with unspent amount in various currencies.

International patent application WO93/08545 discloses a value transfer system having a plurality of electronic purses. Different currencies may be loaded in the purses, and an amount held in a purse may be converted to a different currency. However, this conversion involves the floats of the respective currencies and cannot be handled by the card alone. This prior art payment system is thus not completely flexible with respect to different currencies.

SUMMARY OF THE INVENTION

The object of the invention is to eliminate the above and other drawbacks of the prior art and to provide a payment system which enables currencies to be exchanged during a financing transaction, such as a payment transaction.

Another object of the present invention is to provide a payment system which allows an off-line conversion of currencies.

A further object of the invention is to provide a payment means for application in such a payment system, as well as a method for safely processing payments in a payment system.

These and other objects are achieved by a payment system in which the payment means is arranged to convert calculation units such that the amount credited and the amounted debited; may be expressed in different calculation units.

Because a conversion of calculation units has been provided, currencies, or other values may be converted. As a result, a first balance may be credited in a first currency (e.g., Dutch guilders), with a second balance being debited in a second currency (e.g., German marks).

Preferably, the payment system of the invention is implemented such that the second value is composed of at least a third and a fourth value, each of which is expressed in a different calculation unit. In other words, the debiting of the second value may take place in more than one calculation unit. Thus, a payment may be effected by debiting the balance of several calculation units, such as by debiting two currencies e.g., Dutch guilders and German marks, or Dutch guilders and British pounds). This has the advantage that the holder of the card may dispose of several balances of the payment means, irrespective of the calculation unit in which the payment itself (i.e., the crediting of the first value) must take place. In addition, it is made possible in this manner to use up remaining balances, even if no payments in the calculation units in question themselves are required.

Generally the first and second values, if they are expressed in the same currency, will be identical. It is conceivable, however, that e.g. transaction costs are charged, as a result of which the amount debited in the payment means may exceed the amount credited in the payment station.

Since it is possible with the payment means according to the invention to exchange currencies during a transaction, it is possible, in the event of payment, to debit several counters. As a result, in the first place the option is created of paying even if no sufficient balance is available of the currency required for the payment. After all, other currencies may be drawn on. In the second place, the option exists of releasing counters by completely using up a balance of any currency (counter reset) if the amount to be paid is at least equal to the counter reading in question. In this manner, counters may be used for new currencies. In the third place, the option arises of computing a total balance of the payment means in a simple manner. Since, according to the invention, the total balance may be converted into any currency, the user knows what are the maximum spending options of the payment means. In the fourth place, a spending limit may be set (by the user), i.e., not only for each currency separately but also for the payment means as a whole. This spending limit may apply both to each transaction and cumulatively, i.e., for all transactions together.

As referred to above, the invention provides for the payment means, in the event of a payment transaction, to be debited with currency other than the one with which the payment station (e.g., an electronic cash register is credited.

The invention further provides a device for managing payment means, as well as a system for effecting financial transactions.

EXEMPLARY EMBODIMENTS

The invention will be explained in greater detail below by reference to the Figures.

FIG. 1 schematically shows a system for effecting financial transactions.

FIG. 2 schematically shows a table having calculation units according to the invention.

Figure 3:
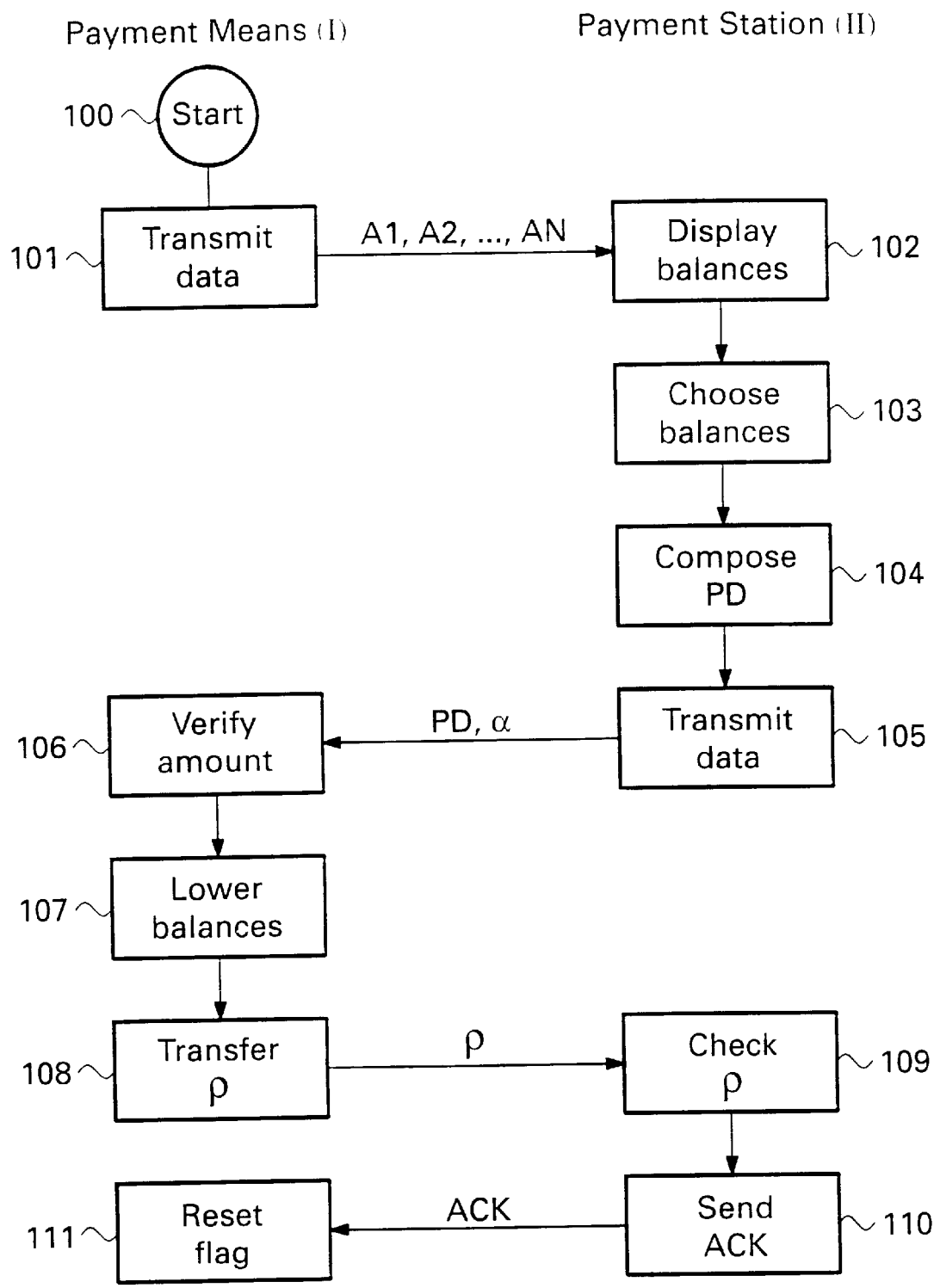

FIG. 3 schematically shows a method for effecting, with an electronic payment means, a payment transaction according to the invention.

Figure 4:
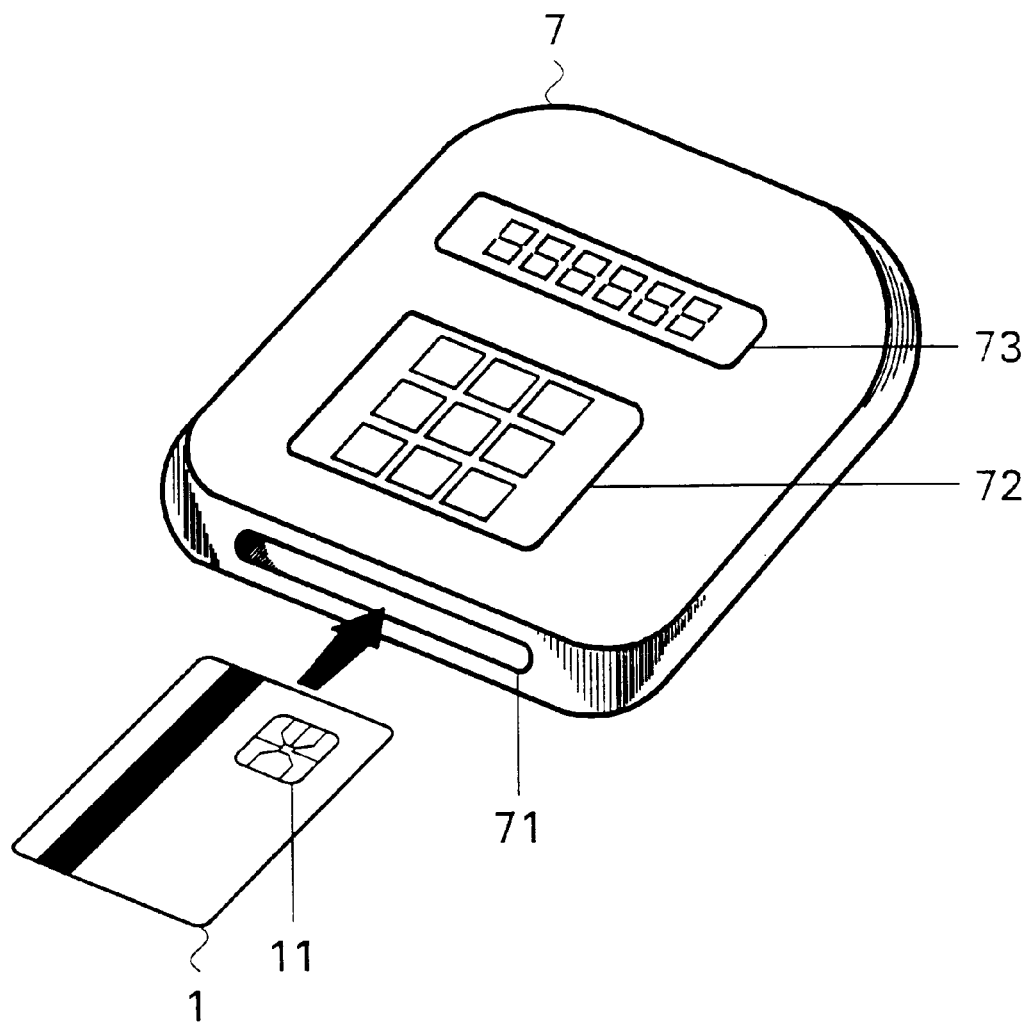

FIG. 4 schematically shows a device for managing a payment means according to the invention.

The system shown in FIG. 1 comprises a payment means 1, a payment station 2, a first financial institution 3 and a second financial institution 4. An interaction $I_1$ between the payment means 1, which may be a so-called "smart card", and the payment station 2, takes place as part of a financial transaction. This interaction $I_1$ comprises the exchange of data, e.g., relating to the identity of the payment station and of the payment means, and amounts to be paid and the corresponding calculation units. In the event of a transaction, such as a payment, not only are the values in question recorded, but also the calculation units of such values. The payment station 2 may be an electronic cash register which is designed for electronic payment with payment means such as payment means 1. An interation $I_1$ between the first financial institution 3 and the second financial institution 4, takes place which comprises, inter alia, the exchange of data relating to payments effected (such as in the interaction $I_1$). The first and second financial institutions may be the same.

As mentioned earlier, problems may arise in financial transactions with a payment means 1 if the payment means disposes of several different calculation units. According to the invention, such problems may be solved by permitting, in the payment system, that payment may be effected with several calculation units in a single transaction. For this purpose, a table is stored in the payment means 1 as shown in FIG. 2. This table comprises rows, each having an amount (A), a calculation unit (C), a conversion factor (R) and possibly a priority factor (P). Regarding the first calculation unit, it is e.g. recorded that the amount A1 is 317.50, the calculation unit C1 is the German mark, the conversion factor R1 (as compared to a reference calculation unit) is 1.10, and the priority P1 is 2. Apart from a currency, the calculation unit may be, e.g., a telephone pulse; the reference calculation unit may be the currency of the country of issue (e.g., Dutch guilder), but also another currency or unit, such as the ECU or the Japanese yen. In the event of a payment transaction, the balance of the calculation unit required by the payment station is preferably debited by default. As an alternative, the reference calculation unit may serve as default unit. The reference calculation unit as such may be assigned a priority (P) equal to 1.

The conversion factors R1, R2, . . . , which in the event of a currency are exchange rates, are primarily informative: they give the user information relating to the value of the various balances. Advantageously, when a payment is effected, a conversion factor is used which is stored in the payment station and which is updated regularly, e.g., daily.

The diagram of FIG. 3 shows, by way of example, a possible embodiment of the method according to the invention. The payment means 1 (see FIG. 1) is schematically referred to by I, the payment station 2 by II.

In step 100, the payment means is activated. In the subsequent step 101, the payment means transmits data, including the balances (amounts) A1, A2, . . . AN, to the payment station. In step 102, the payment station displays these balances, preferably multiplied by their respective conversion factors. The user may now choose, e.g., with the help of a keyboard available on the payment station, or by intervention of a device according to FIG. 4, which balance or which balances he/she will draw on for the payment, in other words, in which calculation unit (currency, pulse) he will pay. It may be advantageous to provide for a default value, such as the calculation unit required by the payment station.

In step 103, the user chooses the balances to be used. In this connection, it is checked whether the amounts to be paid do not exceed a spending limit per calculation unit and/or per transaction. If such is the case, a return is made to step 103. If the spending limits have not been exceeded, in step 104 the payment data PD is composed of the balances chosen and supplementary (identification) information. In step 105, a random number $\alpha$ is generated and, together with the payment data PD, transferred to the payment means. This random number $\alpha$ serves to protect the procedure and prevents so-called "replay" by third parties.

In step 106 it is verified, in the payment means, whether the total amount to be paid is available and, by means of a cryptographic function S and a (secret) key s, a value $\rho$ is produced which will be applied to verify the procedure.

In step 107, the balances in question (A in FIG. 2), as well as the available amounts, are lowered. Possibly, a flag may be set ("busy") to indicate that the procedure may not be interrupted at this stage. Subsequently, in step 108 the value $\rho$ is transferred to the payment station. In step 109, the payment station checks the value $\rho$, e.g., by enciphering the payment dates and the value a with a public key $\pi$ and a function T, which is the inverse of S: $T_\pi = S_\sigma^{-1}$. If the outcome of this operation indeed produces $\rho$, in step 110 an acknowledgement ACK is sent to the payment means, whereupon the payment means in step 111 resets the flag ("busy") set earlier. This concludes the transaction.

The method described above according to the invention therefore offers both a conversion of calculation units and a verification of the payment means.

The device ("wallet") 7 for managing a payment means 1, which is schematically shown in perspective in FIG. 4, comprises an opening 71 for receiving the payment means 1, a keyboard 72 and a display screen 73. Internally, the device 7 may comprise a controller, a memory, and a connector for contacting the contacts 11 of the payment means 1. The controller may comprise a microprocessor which is also able to carry out cryptographic operations. The connector constitutes the mechanical and electrical coupling to the payment means 1 but, in the event of contactless payment cards, it may be replaced by other suitable means for realising an (electromagnetic) coupling to the payment means 1. In addition, the device 7 may be provided with means for exchanging data with a payment station by means of optical, electrical and/or acoustical signals.

According to the invention, the device 7 is provided with means for converting calculation units, such as currencies. The table of FIG. 2 may be advantageously made visible on the display screen 73. In this manner, the user is able to check the balances A1, A2, ... in FIG. 2). The device 7 may advantageously display a total balance of the balances A1, A2, ....

It will be understood by those skilled in the art that the invention is not limited to the embodiments shown, and that many modifications and additions are possible without departing from the scope of the invention.

We claim:

1. A payment system comprising:
   an electronic payment device including an internal memory for storing at least two balances, each balance having an associated number of a corresponding calculation unit and an associated conversion factor; and
   a payment station for (1) receiving, during a payment transaction, a monetary value by crediting a first value, in the payment station, to a first balance representing a first number of a first calculation unit, and (2) debiting a second value corresponding to the first value, in the payment means, wherein a portion of the second value is debited from each of (2a) a second balance representing a second number of a first calculation unit and (2b) a third balance representing a third number of a second calculation unit.

2. The payment system according to claim 1, wherein the payment device further comprises a memory for storing, for each of the at least two balances, an associated priority, and
   wherein the payment station selects the second and third balances to debit according to corresponding priorities of the second and third balances.

3. The payment system according to claim 1, wherein the payment device further comprises a calculation means for determining a total balance, expressed in one calculation unit, of the at least two balances.

4. The payment system according to claim 1, wherein the memory of the payment device storing the conversion factors comprises a reprogrammed memory for periodically updating the conversion factors.

5. The payment system according to claim 1, wherein the first and second calculation units comprise currencies of different countries.

6. The payment system according to claim 5, wherein one of the first and second calculation units is the Euro.

7. A payment system comprising:
   an electronic payment device including an internal memory for storing at least two balances, each balance having an associated number of a corresponding calculation unit and an associated conversion factor; and
   a payment station for (1) receiving, during a payment transaction, a monetary value by crediting a first value, in the payment station, to a first balance representing a first number of a first calculation unit, and (2) debiting a second value corresponding to the first value, in the payment means, wherein a portion of the second value is debited from each of (2a) a second balance representing a second number of a second calculation unit and (2b) a third balance representing a third number of a third calculation unit.

8. The payment system according to claim 7, wherein the payment device further comprises a memory for storing, for each of the at least two balances, an associated priority, and
   wherein the payment station selects the second and third balances to debit according to corresponding priorities of the second and third balances.

9. The payment system according to claim 7, wherein the payment device further comprises a calculation means for determining a total balance, expressed in one calculation unit, of the at least two balances.

10. The payment system according to claim 7, wherein the memory of the payment device storing the conversion factors comprises a reprogrammable memory for periodically updating the conversion factors.

11. The payment system according to claim 7, wherein the first, second and third calculation units comprise currencies of different countries.

12. The payment system according to claim 11, wherein one of the first, second and third calculation unit is the Euro.

13. An electronic payment device comprising:
    an integrated circuit including (1) a processor, (2) a memory, and (3) input and output circuitry, wherein the memory includes memory areas for storing two balances, each of the two balances including (2a) a corresponding number of a calculation unit and (2b) an associated conversion factor, wherein the processor and memory are configured to debit a value stored in the integrated circuit by debiting a cost of a transaction against a portion of each of the two balances when the two balances are stored in different calculation units; and
    a substrate for mounting the integrated circuit.

14. The electronic payment device according to claim 13, wherein each of the two balances further comprises an associated priority according to which the transaction is debited.

15. The electronic payment device according to claim 13, wherein the processor and memory are further configured to determine, expressed in one calculation unit, a total balance of the two balances stored in the memory.

* * * * *

UNITED STATES PATENT AND TRADEMARK OFFICE
CERTIFICATE OF CORRECTION

PATENT NO. : 6,016,955
DATED : January 25, 2000
INVENTOR(S): Peter Jacobus Nicolaas de Rooij et al.

It is certified that an error appears in the above-identified patent and that said Letters Patent is hereby corrected as shown below:

In the abstract, last line, change "payment transaction" to --payment device transaction--.

Column 1, line 32, change "carryingout operations" to --carrying out operations--.

Column 3, line 51, change "An interation $I_1$" to --A second interaction $I_2$--.

Signed and Sealed this

Third Day of April, 2001

Attest:

NICHOLAS P. GODICI

Attesting Officer

Acting Director of the United States Patent and Trademark Office